(12) United States Patent
Leedy

(10) Patent No.: US 7,218,614 B1
(45) Date of Patent: May 15, 2007

(54) CALLING PARTY CONTROL FOR AN INTEGRATED SERVICE HUB

(75) Inventor: Brad Leedy, East Lansing, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 898 days.

(21) Appl. No.: 10/085,942

(22) Filed: Feb. 28, 2002

(51) Int. Cl.
*H04L 12/28* (2006.01)

(52) U.S. Cl. .................. 370/254; 370/352; 370/401; 379/219

(58) Field of Classification Search ................ 370/230, 370/254, 351–356, 389, 390, 392–393, 400–402, 370/419, 473–475; 379/219, 242
See application file for complete search history.

(56) References Cited

U.S. PATENT DOCUMENTS

| | | | | |
|---|---|---|---|---|
| 4,922,529 A | * | 5/1990 | Kiel | 379/377 |
| 5,450,471 A | * | 9/1995 | Hanawa et al. | 455/550.1 |
| 5,577,113 A | * | 11/1996 | Bray et al. | 379/220.01 |
| 5,768,344 A | * | 6/1998 | Kruger et al. | 379/35 |
| 5,812,637 A | * | 9/1998 | Schornack et al. | 455/426.1 |
| 5,881,142 A | | 3/1999 | Frankel et al. | 379/167 |
| 5,963,620 A | | 10/1999 | Frankel et al. | 379/93.05 |
| 6,075,784 A | | 6/2000 | Frankel et al. | 370/356 |
| 6,141,339 A | | 10/2000 | Kaplan et al. | 370/352 |
| 6,466,799 B1 | * | 10/2002 | Torrey et al. | 455/462 |
| 6,967,928 B1 | * | 11/2005 | Kikuta | 370/252 |
| 2004/0202310 A1 | * | 10/2004 | Li | 379/377 |
| 2004/0228336 A1 | * | 11/2004 | Kung et al. | 370/352 |

OTHER PUBLICATIONS

U.S. Appl. No. 09/197,044, filed Nov. 20, 1998, Way et al.
U.S. Appl. No. 09/226,575, filed Jan. 7, 1999, Rush et al.
U.S. Appl. No. 09/650,985, filed Aug. 30, 2000, Togami.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich et al.
U.S. Appl. No. 09/727,201, filed Nov. 30, 2000, Mahaney et al.

(Continued)

*Primary Examiner*—Chau Nguyen
*Assistant Examiner*—Saba Tsegaye

(57) ABSTRACT

A method and apparatus for notifying a user device coupled to an integrated services hub (ISH) that a remote device has terminated communication with the user device. A network interface within the ISH receives a disconnect message from the remote device and routes the disconnect message to a CPU. The CPU determines which user device had been in communication with the remote device and sends a call termination notification signal to a user device interface coupled to the appropriate user device. The termination notification signal comprises temporarily placing the user device interface in a disabled state for a predetermined amount of time. After sending the call termination notification signal, the CPU detects whether the user device is still in an off-hook status. If the user device is off hook, the CPU sends another call termination notification signal by again temporarily placing the user device interface in a disabled state.

13 Claims, 1 Drawing Sheet

OTHER PUBLICATIONS

U.S. Appl. No. 09/745,919, filed Dec. 21, 2000, Bayerl et al.
U.S. Appl. No. 09/745,000, filed Dec. 21, 2000, Bayerl et al.
U.S. Appl. No. 09/747,907, filed Dec. 22, 2000, Barrow.
U.S. Appl. No. 09/751,778, filed Dec. 29, 2000, Lawitzke.
U.S. Appl. No. 09/998,419, filed Nov. 29, 2001, Barrow.

* cited by examiner

CALLING PARTY CONTROL FOR AN INTEGRATED SERVICE HUB

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to an integrated services hub (ISH) for use with broadband packet networks, and more specifically it relates to a method and apparatus for notifying a user device coupled to an ISH that a remote device has terminated communication with the user device.

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports (also referred to as jacks) for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the ISH and the network element is typically an ATM connection, which is much different from the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line. Another of the traditional telephony functions that it would be useful for the ISH to provide is the capability of notifying a user device that a remote device has terminated its communication with the user device.

SUMMARY OF THE INVENTION

The present invention discloses a method and apparatus for notifying a user device coupled to an integrated services hub (ISH) that a remote device has terminated communication with the user device. A network interface within the ISH typically receives a disconnect message from the remote device. The ISH typically contains a CPU that receives the disconnect message from the network interface. The CPU then determines which user device had been in communication with the remote device and sends a call termination notification signal to a user device interface coupled to the appropriate user device. In an embodiment of the invention, the user device interface is a subscriber line interface circuit (SLIC). The call termination notification signal typically comprises temporarily placing the user device interface in a disabled state for a predetermined amount of time. The user device coupled to the user device interface is typically able to interpret the call termination notification signal as a signal to enter the on-hook status. After sending the call termination notification signal to the user device interface, the CPU detects the status of the user device to ensure that the user device is in an on-hook status. If the user device is still off hook, the CPU sends another call termination notification signal to the user device interface; that is, the CPU again temporarily places the user device interface in a disabled state.

DETAILED DESCRIPTION OF THE PREFERRED EMBODIMENTS

Figure 1:
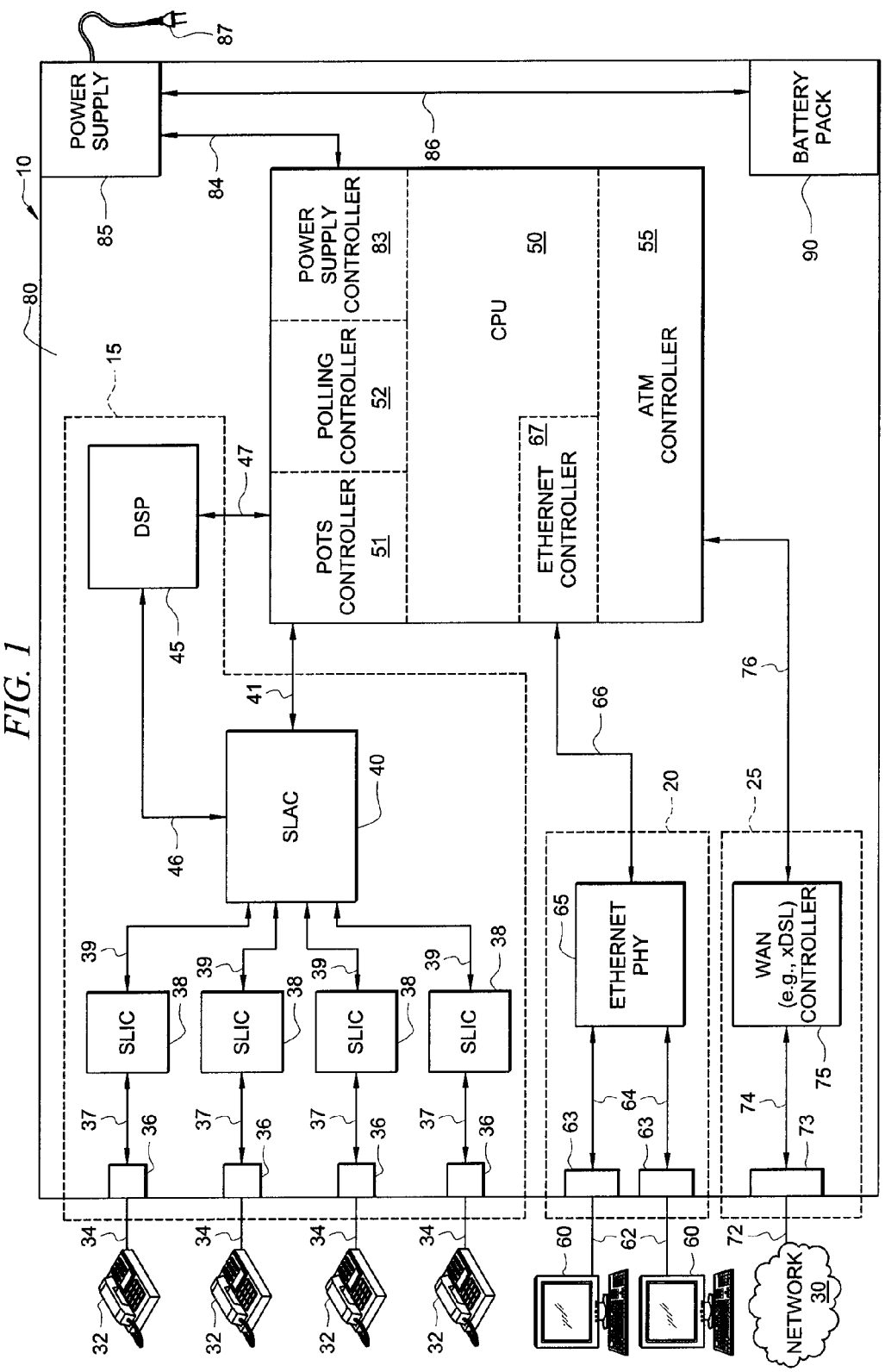
FIG. 1 is a block diagram of an integrated services hub useful in carrying out the invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a wide area network 30, preferably a broadband packet network such as Sprint's ION network. In describing the ISH, the components are generally described in carrying out the appropriate function to transmit data from the user interfaces to the WAN, and it should be understood that these components in general perform the reverse function when receiving data from the WAN and transmitting it to the user interfaces. In the following discussion and in the claims, the terms "couple" or "couples" are intended to mean either an indirect or direct connection. Thus, if a first device couples to a second device, that connection may be through a direct connection, or through an indirect connection via other devices and connections.

Telephones 32 are coupled by telephone lines 34 to POTS interface 15 by telephone jacks 36, for example industry standard RJ-11 or RJ-14 jacks. As used herein telephone generally refers to a device, a portion of which is typically handheld, for converting sound to electrical signals and vice-versa and further comprising a ringer that rings in response to a ring current, provided however that telephone should also be understood to include any device that responds to telephony signals such as a facsimile machine, modem, or computer. Telephones typically use the analog telephony format. Digital format telephones could also be used, with the understanding that the specific support circuitry in the ISH would change while providing equivalent functions (for example, detecting hook transitions).

Telephone line 34 is the physical connection connecting the telephone to a connector (i.e., jack 36) on the ISH and may be any medium operational to carry telephony signals, typically twisted pairs of copper wires. The telephone line carries electrical signals and ring current from the ISH to one or more telephones coupled to the telephone line. Telephone circuit refers to the telephony signal loop formed by the connection of one or more telephones to a POTS port on the ISH via a telephone line.

POTS interface 15 typically comprises a plurality of telephone circuits. While four telephone circuits (corresponding to four telephones 32 coupled by four telephone lines 34 to four jacks 36) are shown in FIG. 1, any desirable number of telephone circuits may be employed provided that the equipment is appropriately sized to accommodate that number. As noted previously, more than one telephone may be coupled to a telephone circuit.

POTS interface 15 further comprises subscriber line interface circuits (SLICs) 38, subscriber line access circuit (SLAC) 40, and digital signal processor (DSP) 45. In the preferred embodiment of FIG. 1, SLICs 38 are coupled to telephone jacks 36 by connections 37 on a one-to-one basis. In other words, each telephone circuit (and its corresponding jack, telephone line, and one or more telephones) has a separate and corresponding SLIC. Alternatively, SLICs may incorporate more than one channel each, that is to say a SLIC may be connected to more than one telephone circuit. The SLICs convert relatively high power, two-line analog signals (also referred to as a tip and ring telephone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, Inc., the former Communications Products Division of Advanced Micro Devices (AMD), Inc.

SLAC 40 is coupled to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While the embodiment shown in FIG. 1 uses a SLAC to perform line supervision, SLICs are available that perform line supervision functions, and such enhanced SLICs having integral hook transition monitoring capability could be used in carrying out the invention. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Legerity, Inc., the former Communications Products Division of Advanced Micro Devices (AMD), Inc., which are each quad-devices designed to manage four SLICs.

SLAC 40 transmits and receives control data such as line status and signaling to the central processing unit (CPU) 50 by connection 41. The CPU (commonly referred to as a microprocessor) controls the overall function of the ISH and has initialization, management, configuration, and control responsibilities for all of the components and interfaces comprising the ISH. CPU 50 contains control software, which is stored in memory (for example, flash memory), and the control software is executed by the CPU. Upon execution of the control software, the CPU interacts with various memory mapped peripherals (for example, WAN interface 25). The CPU control software includes a) a POTS control module 51 that controls the telephony functions during operation of the ISH under primary power; b) a polling control module 52 that controls the POTS telephony functions when primary power fails; c) a AC power supply control module 83 which monitors, either continuously or periodically, the AC power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to network 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with network 30. In a preferred embodiment, ATM control module 55 is a combination of hardware and software on CPU 50.

Computers 60 are coupled by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 coupled to LAN connectors 63 by connections 64. LAN PHY device 65 is preferably an ethernet PHY, and more specifically an MII transceiver. CPU 50 contains an ethernet control module 67, which serves as a media access control (MAC) device and is coupled to LAN PHY device 65 by connection 66. The ethernet PHY and MAC devices support a 10/100 Mbit industry standard MII ethernet connection.

Network 30 is coupled by connection 72 to WAN interface 25 by WAN connector 73. WAN connector 73 is preferably an RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 coupled to WAN connector 73 by connection 74. WAN controller 75 is coupled to ATM control module 55 by connection 76. WAN controller 75 is preferably Globespan's G7000 multimode chip set, which further comprises an analog front end (AFE) chip (Globespan GT3180) and a multimode xDSL downloadable DSP and framer chip (Globespan GS7070). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is coupled to AC power supply 85 and battery pack 90, thereby providing power to the ISH components, the attached analog telephones, and the battery monitoring and charge circuitry. CPU 50 contains AC power supply control module 83 coupled to AC power supply 85 by connection 84. A preferred AC power supply is a universal-input (40–400 Hz, 90–270V AC RMS) switchmode lead/acid battery float charger with a current-limited output of nominally 13.8 V, and provides charging current to battery pack 90 as represented by connection 86. A preferred battery is a 12 volt DC, 2.5 A gel cell (lead-acid) battery, and preferably battery pack 90 comprises two such batteries housed within the ISH.

The AC power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls. Given that the ISH requires power in order to provide basic telephone service, it is important to reduce power consumption, and thereby extend battery life as long as possible. A method and apparatus for polling telephony line status in an integrated services hub to reduce power consumption is disclosed and claimed in U.S. Pat. No. 6,512,817 issued Jan. 28, 2003, incorporated by reference herein in its entirety.

In order for ISH 10 to communicate with network 30, WAN interface 25 must establish a connection with a network element, such as a service manager, a network server, a network controller, or the like. The procedure for establishing a network connection is dependent on the type of WAN interface. For T1 and ATM (more specifically, ATM-25) the network connection protocol is a simple link-layer protocol utilizing periodic framing signals without training or automatic adaptation. For ADSL and HDSL-2, initial physical and lower protocols (commonly referred to as "handshake and training protocols") are performed. These protocol layers are located on and used by the WAN interface to determine the parameters governing the network connection such as status of the line, data transfer rates, type and speed of equipment on both ends of the line, etc. The WAN interface determines the line condition, and both ends of the link agree on the optimum configuration for those line conditions. Where the network connection is broken, for example by a power cycle or reset of the ISH, a delay is often encountered as a result of running these handshake and training protocols. During this delay in establishing the network connection, telephony services are unavailable even though the ISH is functional. To aid the customer in troubleshooting the system, it is beneficial to inform the customer that telephony functions are unavailable because the network connection is down. Co-pending U.S. application Ser. No. 09/702,933 (Sprint docket number IDF 1499), filed Oct. 31, 2000, incorporated by reference herein in its entirety, provides such information to the customer by checking the status of the network connection and playing an audible warning tone in the telephone receiver if the ISH is not connected to the network.

In an embodiment of the ISH described above, POTS interface 15 provides a customer with four separate telephones lines. Each telephone line can typically operate in one of three states, disabled, standby, or active. Each SLIC 38 controls the state (also referred to as mode) of its corresponding telephone line 34. When a SLIC (and its corresponding telephone line) is in a disabled state, the SLIC (i.e., amplifier) that drives power onto the line is shut down. In other words, the disabled state refers to the line being "off" or dead. In disabled state, no line supervision is possible, and thus hook transitions (i.e., on-hook, off-hook, etc.) cannot be detected. When a SLIC (and its corresponding telephone line) is in a standby state, the SLIC is turned on and a small amount of current and voltage is driven to the line so that hook transitions can be detected. When a telephone line is in active state, the SLIC is turned on, the user device (e.g., telephone) connected to the line is off-hook, and a greater amount of current and voltage is driven to the line to power the user device. The state of each SLIC is controlled by an internal register within the SLAC, and this internal register is programmed through software residing on the CPU. While FIG. 1 shows a control path to the SLICs as routed through SLAC 40, it should be understood that the CPU optionally can be configured to communicate directly with the SLICs.

Once a network connection has been established, the ISH is available to receive incoming telephone calls. A network element (e.g., service manager) sends an incoming call signal to the ISH, which is received by WAN interface 25 and is communicated to ATM control module 55, which in turn communicates the incoming call signal to POTS control module 51. POTS control module 51 receives the incoming call signal (which contains instructions from the service manager identifying the correct telephone circuit to receive the incoming call) and routes the signal to the POTS port (i.e., jack), telephone line, and user device corresponding to the correct telephone circuit. The user device is in an off-hook status while the call is in progress.

When a remote device terminates a call, a user device (e.g., telephone, answering machine, facsimile machine, modem) coupled to the ISH does not necessarily know that the call has terminated. The user device may remain in an off-hook status and occupy the line unnecessarily. The user device should preferably be notified that termination has occurred so that it can be made available to place or receive other calls. That is, the user device should change from off-hook status to on-hook status.

Upon terminating a call, a remote device typically sends a disconnect signal to a network element such as a service manager. The disconnect signal is typically a DLCX (Delete Connection) message sent via a standard protocol such as STCP. In an embodiment of the present invention, the service manager then relays the disconnect signal to the WAN interface 25 within the ISH 10. The disconnect signal is then passed from the WAN interface 25 through the ATM control module 55 to POTS control module 51. It is possible that the user device has already been placed on-hook at this point. For example, during an ordinary telephone conversation, the user of the user device can hang up the phone. Therefore, upon receiving the disconnect signal, POTS control module 51 determines the status of the user device to which the disconnect signal pertains, for example by checking the status of the corresponding internal register within the SLAC. If the user device is on-hook, POTS control module 51 places the SLIC 38 in a standby state and no further action is needed. If the user device is off-hook, as will often be the case when the user device is an automated device such as an answering machine, facsimile machine, or modem, the user device will need to be placed on-hook and the SLIC 38 will need to be placed in a standby state. A call termination notification signal is sent from the ISH 10 to the user device. In an embodiment, the call termination notification signal comprises temporarily placing the user device interface (e.g., SLIC 38) in a disabled state. POTS control module 51, via SLAC 40, places the SLIC 38 in a disabled state for a predetermined amount of time. User devices are typically able to interpret this call termination notification signal as a command to return to an on-hook status. Thus, when POTS control module 51 sends a call termination notification signal to the user device by temporarily changing the state of SLIC 38, the user device coupled to the SLIC 38 should enter an on-hook status.

The amount of time the SLIC 38 is placed in the disabled state can be configured in a range that is typically between 650 milliseconds and one second. Upon the expiration of this time, the POTS control module 51 checks the status of the user device coupled to SLIC 38 as described previously. If the user device has returned to on-hook status, POTS control module 51 places SLIC 38 in the standby state. The user device is then ready to place or receive another call. If the user device is still in an off-hook status, POTS control module 51 returns SLIC 38 to the active state and begins a timer with a duration of, for example, about ten seconds. Upon expiration of the ten-second timer, POTS control module 51 again checks the status of the user device. If the user device has not returned to the on-hook status, POTS control module 51 sends a call termination notification signal to SLIC 38 as before. This cycle of counting ten seconds, sending a call termination notification signal, and checking the status of the user device will continue until the user device is returned to an on-hook status and is thus able to place or receive new calls. When on-hook status is achieved, POTS control module 51 places SLIC 38 in the standby state.

What is claimed is:

1. A method for notifying a user device coupled to an integrated services hub that communication has been terminated with a remote device comprising:

receiving a disconnect signal from the remote device into the integrated services hub;

determining the status of the user device; and when the user device is off-hook, relaying a call termination notification signal to the user device from the integrated services hub via a user device interface coupled to the user device;

wherein the call termination notification signal comprises temporarily placing the user device interface in a disabled state;

wherein the disconnect signal is received from the remote device by a network interface within the integrated services hub;

wherein the network interface sends the disconnect signal to a CPU within the integrated services hub.

2. The method of claim 1 wherein the network interface is a WAN interface.

3. The method of claim 1 wherein the CPU determines the user device to which the disconnect signal pertains.

4. The method of claim 3 wherein the call termination notification signal is sent from the CPU to the user device interface coupled to the user device.

5. The method of claim 4 wherein the user device interface is a SLIC.

6. The method of claim 5 wherein the call termination notification signal sent to the SLIC indicates to the user device that the user device should enter an on-hook status.

7. The method of claim 6 wherein the CPU places the SLIC in a standby state upon the user device entering an on-hook status.

8. The method of claim 7 further comprising:
   detecting the status of the user device by the CPU after sending the call termination notification signal to the SLIC; and
   when the user device is in an off-hook status, sending another call termination notification signal to the SLIC.

9. An apparatus for notifying a user device coupled thereto that communication has been terminated with a remote device comprising:
   a network interface configured for receiving a disconnect signal from the remote device into the apparatus;
   a CPU coupled to the network interface and configured for determining the status of the user device; and
   a user device interface coupled to the user device and the CPU and configured for relaying a call termination notification signal from the CPU to the user device when the user device is off-hook;
   wherein the call termination notification signal comprises temporarily placing the user device interface in a disabled state.

10. The apparatus of claim 9 wherein the apparatus is an integrated services hub.

11. The apparatus of claim 10 wherein the network interface is a WAN interface.

12. The apparatus of claim 11 wherein the user device interface is a SLIC.

13. The apparatus of claim 12 further comprising a SLAC coupled to the SLIC and the CPU, the SLAC having an internal register for indicating the state of the SLIC, the internal register being accessible by the CPU.

* * * * *